July 1, 1930.  J. C. YORDON  1,768,653
BABBITTED SHIM AND METHOD OF MAKING THE SAME
Filed Aug. 27, 1925
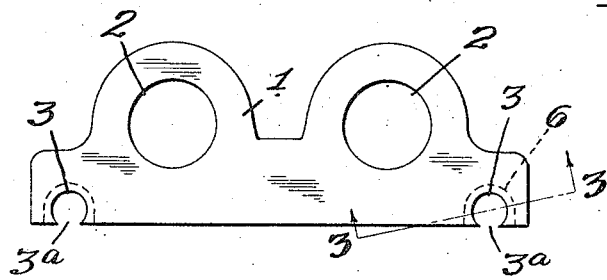
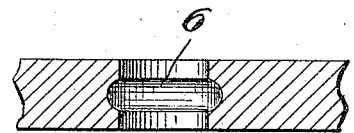
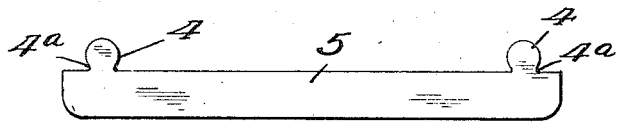
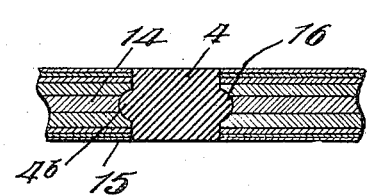
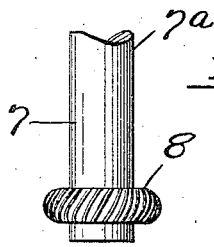
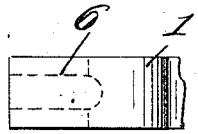
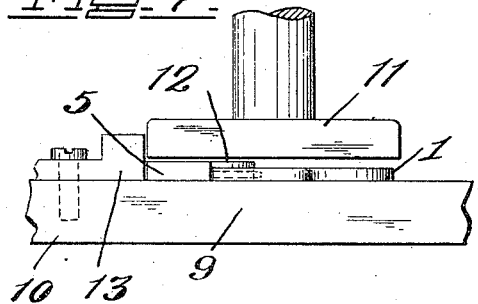
INVENTOR
JOHN C. YORDON
BY
ATTORNEYS Patented July 1, 1930

1,768,653

UNITED STATES PATENT OFFICE

JOHN CLIFFORD YORDON, OF QUEENS VILLAGE, NEW YORK, ASSIGNOR TO LAMINATED SHIM COMPANY, INC., OF LONG ISLAND CITY, NEW YORK, A CORPORATION OF NEW YORK

BABBITTED SHIM AND METHOD OF MAKING THE SAME

Application filed August 27, 1925. Serial No. 52,838.

This invention relates to shims and to a method of manufacturing the same.

It is the object of the invention to provide a composite shim comprising a body portion which may be of solid or laminated construction and a facing member of softer material permanently secured thereto.

A further object of the invention is to provide a method of securing the facing member to the body portion of a shim of the type described, whereby separation of the facing member from the body portion will be effectively prevented.

Various other objects and advantages of the invention will appear as the description thereof proceeds.

This invention may be considered as an improvement on the invention described and claimed in the patent to Bradford Darrach, Jr., No. 1,417,039, granted May 23, 1922.

Referring now to the drawings, which illustrate the various preferred forms of embodiment of the invention and the method of practicing the same.

Figure 1 is a plan view of the body portion of a shim.

Figure 2 is a plan view of a facing member designed to cooperate with the body portion shown in Figure 1.

Figure 3 is a detailed sectional view on the line 3—3 of Figure 1.

Figure 4 is a similar sectional view of a laminated body portion.

Figure 5 is a side view of a cutter considerably enlarged to show details thereof, showing the tongue of the facing member therein.

Figure 6 is a side view of a body portion illustrating the manner of using the cutter.

Figure 7 is a side view of an assembling press showing the body portion and facing member mounted therein for final assembly.

In the embodiment of the invention illustrated in Figures 1 to 3, the shim comprises a body portion 1 of solid metal, which is preferably brass or copper, having holes 2 therein for receiving the bolts which fasten the two sections of the bearing, between which the shims are used, together and grooves or openings 3 in the face thereof for receiving tongues 4 on the soft metal facing member 5 for holding these two members together. The grooves 3 are contracted in size near the front thereof as indicated at 3ª and the tongues 4 have reduced portions 4ª where they join the body portions, so that the tongues 4 and grooves 3 interfit with a dovetail effect when assembled together. Approximately midway of the length thereof the grooves 3 are provided with an enlargement or slot 6 into which metal from the tongues 4 of the facing member 5 may be compressed or flowed when the facing member and body portion are pressed together to lock the tongues on the facing member from slipping out of the grooves on the body portion.

In the manufacture of the shim the body portions 1 may be stamped from sheet brass of the proper thickness, the body portion 1, holes 2 and grooves 3 being preferably formed in the one stamping operation.

Cutters 7 having cutter shafts 7ª of smaller diameter than the reduced portion 3ª of the grooves 3 and having cutting or milling blades 8 projecting therefrom are provided for milling the slots 6 in the grooves 3. The stamped body portion 1 is pushed against this cutter with the shaft 7ª passing into the groove 3 so that the rotation of the cutter shaft mills the slots 6 in the grooves.

The facing members 5 with the integral tongues 4 are stamped from a sheet of soft metal preferably of lead or babbitt.

The formed body portion 1 and the facing member 5 are then assembled on the bed 9 of a suitable power press 10, having a reciprocating platen 11 adapted to exert pressure on the material placed on bed 9. The facing members 5 are of greater thickness than the body portions 1 so as to project above the same when assembling on the press as indicated at 12 in Figure 7. When the platen 11 is forced downward it first contacts with the facing member 5 and as this member is formed of soft metal the facing member is compressed by the platen and the metal thereof is squeezed or flowed firmly against all contacting portions of the body member 1 and into the slots 6 in the grooves 3 to firmly lock the facing member to the body portion. A suitable abutment 13 is provided on the press 10 for facilitating the alignment of the shims thereon.

Figure 4 illustrates the body portion 14 similar to the body portion 1 with the exception that it is formed of a plurality of laminations 15 of different thicknesses of metal to facilitate reducing the thickness of the shim for taking up wear on the bearings. The slot 16 in the grooves of the laminated body portion 14 may be formed by the use of a cutter 7 after the body portion is assembled, or it may be formed by stamping the grooves in certain of the laminations of larger size than the grooves in other laminations and stacking them to form the internal anchorage means. The rib which is formed on the tongues 4 of the facing member is indicated at 4ᵇ.

It will be understood that various means other than that shown and described may be used for forming the slot 6 in the grooves 3, and that the grooves may be located in various positions other than that illustrated, or that instead of a slot 6 the interior of the groove 3 might be provided with a projecting ledge or one lamination having a groove of smaller size than the other laminations to from a ledge around which the metal of the tongues 4 could be forced by the press 10 to securely lock the facing member to the body portion. It will also be understood that various other modifications and changes may be made in the shim and method without departing from the spirit of the invention or the scope of the appended claims.

I claim:

1. A shim of the type described, comprising a body portion and a facing member secured together by pressure interlocking means to prevent separation of said body portion and facing member in the plane of said body portion and facing member and interlocking means to prevent separation of said body portion and facing member by relative movement in planes perpendicular to the plane of said parts, said second interlocking means being a deep groove within the first interlocking means and a tongue cooperating therewith.

2. A shim of the type described, comprising a body member and a facing member, tongue and groove connections between said members and an interlocking tongue on said first mentioned tongue to prevent the tongues from sliding through said grooves, perpendicular to the plane of said body member.

3. A shim of the type described, comprising a body member and a facing member, tongues on said facing member and grooves on said body member adapted to interfit with a dovetail connection, a circumferential slot in said grooves and a portion of the tongues projecting thereinto to prevent separation of the tongues and grooves.

4. A shim of the type described comprising a body member and a face member, said members having means providing interlocking engagement of said members so as to prevent separation thereof by relative movement in the plane of said members, said means also being shaped to interengage to prevent separation of said members by relative movement in a direction perpendicular to said plane.

5. A shim of the type described comprising a body member and a face member, one of said members having a groove and the other a tongue to engage each groove, each tongue and groove being so shaped that said members are held together against separation by relative movement in the plane of said members, each tongue and groove also being shaped to interengage in such a manner that separation of said members is prevented in a direction transverse to said plane.

In testimony whereof I have affixed my signature.

JOHN CLIFFORD YORDON.